United States Patent Office 3,717,806
Patented Feb. 20, 1973

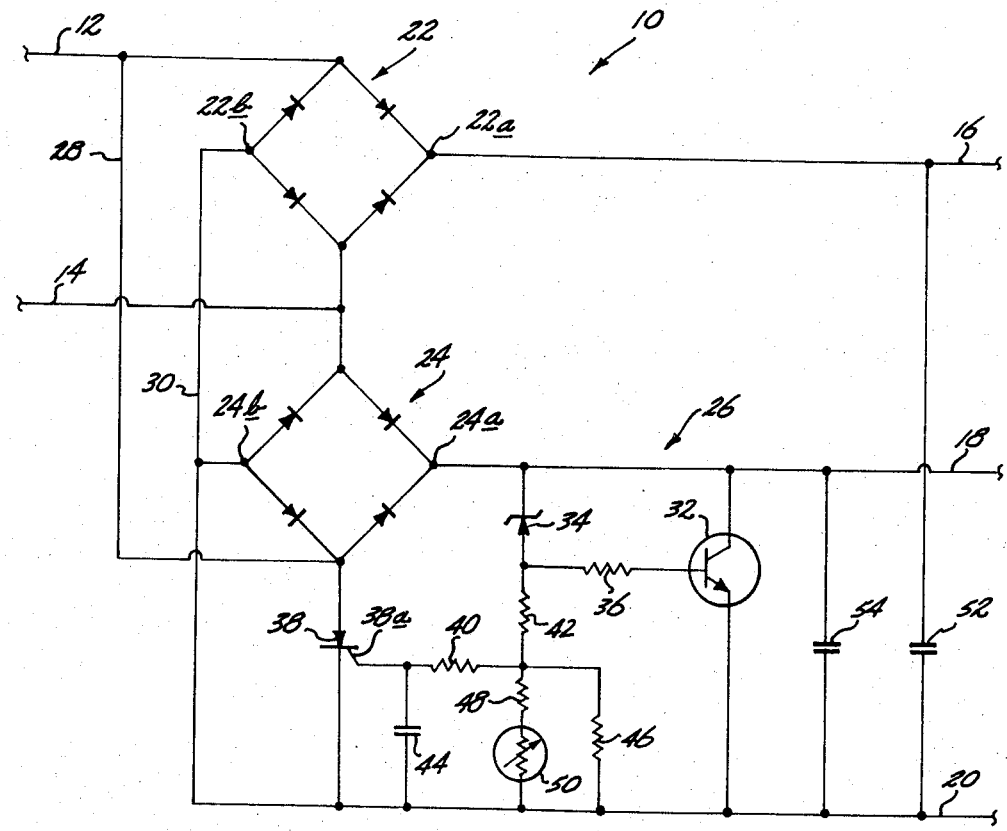

3,717,806
AC-TO-DC CONVERTER
Rex G. Sebring, 8850 Lower River Road,
Grants Pass, Oreg. 97526
Filed Mar. 31, 1972, Ser. No. 240,157
Int. Cl. H02m 7/00
U.S. Cl. 321—18                              9 Claims

ABSTRACT OF THE DISCLOSURE

A low-heat-dissipation AC-to-DC converter capable of supplying regulated DC to one or a pair of output terminals, and suitable particularly for use in the electrical system of a vehicle, such as a motorcycle. The converter includes a pair of rectifier circuits which produce DC from a single AC input, with a shared voltage-regulating circuit employed to regulate the output voltages of both rectifier circuits. Heat dissipation in the converter is minimized through the intermittent conduction of a silicon-controlled rectifier which produces momentary short-circuiting of the AC input.

BACKGROUND AND SUMMARY OF THE INVENTION

This invention pertains to an AC-to-DC converter. More specifically, it pertains to such a converter which has particular utility in the electrical system of a vehicle, such as a motorcycle.

In a vehicle, such as a motorcycle, the electrical system therein usually includes an AC-to-DC converter for converting AC voltage (supplied by the alternator or generator in the vehicle) into DC voltage for operating the ignition, lamp, horn, etc., electrical circuits in the vehicle. In such an application, it is desirable that the converter employed be reliable, compact, durable, and easy to incorporate in various different makes and styles of vehicles.

One problem with conventional converters is that their components, rather than being unitized, i.e., as a single unit easily mounted in a vehicle, are distributed over the vehicle in such a way as to expose wires and other components which may easily be damaged. Another problem is that conventional converters, in the interest of reducing the overall bulk of a vehicle, are overly simplified to a point where their reliability is poor. For example, with many known converters employable in a vehicle of the type mentioned, the turning on of a lamp, such as a headlight in a vehicle, often results in the vehicle's engine dying through lack of adequate momentary power supply to the ignition system. Still another problem characteristic of conventional converters is that their components readily overheat in absorbing non-load-used current, with such heating ultimately resulting in component deterioration and failure.

A general object of the present invention, therefore, is to provide a novel AC-to-DC converter which avoids the difficulties mentioned above in a practical and satisfactory manner.

More specifically, an object of the invention is to provide such a converter which is simple and compact and easy to incorporate in various electrical systems, and which is also extremely reliable in operation.

According to a preferred embodiment of the invention, the same contemplates a pair of bridge rectifier circuits connected to a single pair of AC input terminals which may be connected to any suitable external source of AC. These bridge rectifiers each have a pair of DC output terminals, with one output terminal in each pair connected directly to the corresponding output terminal in the other pair.

Connected between these directly connected output terminals, and one of the other output terminals in one of the rectifiers, is a voltage-regulating circuit which simultaneously regulates the DC output voltages produced by both of the rectifier circuits. A transistor is employed for this purpose, wherein changes in its level of conduction effect such voltage regulation. In order to minimize potentially damaging heat dissipation by the transistor, a novel circuit arrangement is employed including a silicon-controlled rectifier which is connected, effectively, between the AC input terminals, and is constructed to conduct intermittently therebetween on the conduction of the voltage-regulating transistor exceeding a certain level. Conduction in the silicon-controlled rectifier momentarily short-circuits the AC input terminals, and thereby minimizes heat dissipation by the transistor.

Provided for each of the separated DC output terminals of the two rectifier circuits is an energy-storing capacitor which can accommodate surge load demands in a manner preventing the sudden increase of load on one of the rectifier circuits from affecting appreciably the power output available from the other rectifier circuit.

DESCRIPTION OF THE DRAWINGS

These and other objects and advantages attained by the invention will become more fully apparent as the description which follows is read in conjunction with the accompanying drawing which comprises a circuit diagram of a preferred embodiment of the invention.

DETAILED DESCRIPTION OF THE INVENTION

Turning now to the drawing, indicated generally at 10 is an AC-to-DC converter constructed in accordance with the present invention. Although converter 10 may be used in many different kinds of environments, the particular converter shown is adapted for use in the electrical system of a vehicle, such as a motorcycle. To this end, converter 10 includes a pair of AC input terminals, or conductors, 12, 14, a pair of positive DC output terminals, or conductors, 16, 18, and a common output terminal, or conductor, 20. In the environment of an electrical system such as that just mentioned, conductors 12, 14 are connected to the usual AC output terminals of the alternator or generator provided in the vehicle. Conductor 20 may be connected to the chassis of the vehicle. And conductors 16, 18 may be used, respectively, for supplying DC power to lamps, and to the ignition system.

Included in converter 10 are two diode bridge rectifier circuits 22, 24, and a voltage-regulating circuit 26.

Circuits 22, 24 are substantially identical in construction, and may typically comprise ready-made, prepackaged, commercially available units. AC voltage is supplied to circuit 22 directly through conductors 12, 14, and is supplied to circuit 24 through conductor 14, and through a conductor 28 which is connected to conductor 12. Circuits 22, 24 include positive DC output terminals 22a, 24a, respectively, and negative DC output terminals 22b, 24b, respectively. Negative terminals 22b, 24b are directly connected through a conductor 30, which in turn is connected to conductor 20.

Voltage-regulating circuit 26 includes a conventional DC amplifying transistor 32, and a Zener diode 34. While various available units may be used for these components, a transistor which has been found to perform very satisfactorily is an RCA type 2N5490 transistor, and a Zener diode which has been found to be satisfactory is a Motorola type 1N5349 diode. The collector of transistor 32 is connected directly to conductor 18, and the emitter of the transistor is connected directly to conductor 20. The transistor's base connects with the anode of diode 34 through a resistor 36, and the cathode of diode 34 connects directly with conductor 18.

Indicated at 38, and included, broadly speaking, in the voltage-regulating circuit, is a silicon-controlled rectifier, or gatable electronic switching device. As will be more fully explained, operation of this rectifier is relied on to minimize heat accumulation in, or dissipation by, transistor 32. A rectifier which has been found suitable for this purpose is an RCA type 40868 rectifier. It will be noted that rectifier 38 is, in effect, connected directly between the AC input terminals. More specifically, the anode of the rectifier is connected to the junction between the conductor 28 and rectifier circuit 24, and the cathode of the rectifier is connected directly to conductor 20.

As contemplated herein, operation of rectifier 38 is intended to be in response to the level of conduction (i.e., current flow) occurring in transistor 32. Acocrdingly, gate 38a in rectifier 38 is connected through resistors 40, 42 to the junction between resistor 36 and diode 34. As a consequence of this connection, DC voltage applied to gate 38a follows DC voltage at the junction just mentioned, which latter voltage follows the level of conduction in transistor 32. A capacitor 44 connects gate 38a to conductor 20. Connecting the junction between resistors 40, 42 to conductor 20 is another resistor 46. Temperature compensation, to take care of temperature-induced performance changes in diode 38, is provided by a series circuit including a resistor 48 and a thermistor 50. Such an arrangement is conventional. A thermistor which has been found to perform well with the type of silicon-controlled rectifier mentioned above is one manufactured by Fenwal Electronics, Inc., and designated as a type KB21J1 thermistor.

Directly interconnecting conductors 16, 20 is a capacitor 52. And, directly inter-connecting conductors 18, 20 is a capacitor 54.

Explaining now how converter 10 performs, let us assume that the converter is connected in the electrical system of a motorcycle. Under such circumstances, AC input conductors 12, 14 are connected to the output terminals of the motorcycle's alternator or generator. Common conductor 20 comprises a system ground which may be connected electrically to the chassis of the motorcycle. Conductor 16 is connected to the various lamp and horn circuits, and conductor 18 is connected to the ignition system. In the particular circumstance being described, let use assume further that the motorcycle employs no battery.

With the motorcycle's engine running, AC voltage is supplied conductors 12, 14. This voltage, in the absence of limiting action produced by converter 10, might typically have an RMS value of around 30–40 volts during normal idling of the engine. Rectifier circuits 22, 24 produce full-wave rectification of such AC voltage, with circuit 22 producing DC voltage between conductors 16, 20, and circuit 24 producing DC voltage between conductors 18, 20. Capacitor 52 serves as a filtering and energy storage capacitor between conductors 16, 20. Capacitor 54 performs the same function between conductors 18, 20.

Limiting the maximum DC voltage attained both on conductors 16 and 18 vis-à-vis conductor 20 is voltage-regulating circuit 26. With the particular transistor and Zener diode mentioned above, conduction in transistor 32 limits the voltage difference between conductors 18, 20 to about 12.6 volts DC. Because of the manner illustrated in which circuits 22, 24 are interconnected, the voltage limiting, or regulating, action just described also limits the voltage difference between conductors 16, 20 to substantially the same value as that mentioned between conductors 18, 20. Circuit 26 may thus be thought of as a shared voltage-regulating circuit, which simultaneously effects voltage regulation on conductors 16, 18.

With the gate of rectifier 38 connected as shown, rectifier 38 responds to the level or amount of conduction occurring in transistor 32. Such conduction will, of course, increase under circumstances with less DC load current being demanded from conductors 16, 18. When the conduction increases to a certain level, the voltage supplied to gate 38a rises sufficiently to cause rectifier 38 to conduct, with resultant short-circuiting of the AC supply to the rectifier circuits. Such short-circuiting lasts only for a short interval of a single cycle of AC, whereupon the rectifier returns to a nonconducting state. This short-circuiting is easily tolerated by the usual motorcycle alternator or generator. The level of conduction required in transistor 32 to cause turning on of rectifier 38 is a matter of choice, but preferably is selected to limit heat accumulation in, or dissipation by, the transistor to a level well below the maximum heat accumulation or dissipation permitted (as rated) in the transistor. Such operation of the silicon-controlled rectifier effectively prevents potentially damaging heat buildup in the transistor.

The temperature compensating circuit mentioned earlier, which circuit is provided for rectifier 38 (such circuit including thermistor 50), compensates for heat-produced performance changes in the silicon-controlled rectifier, whereby the latter essentially always begins conducting on the same level of conduction occurring each time in transistor 32.

Should a large-current load be applied suddenly to either of conductors 16, 18, such action has little appreciable effect on power being supplied through the other of these conductors. More specifically, with the motorcycle operating, when the headlight is suddenly turned on, there is no appreciable loss of power to the ignition system which might cause the motorcycle engine to falter or to stop running.

The proposed converter is one which can easily be packaged in a small unitary assembly which is easy to incorporate in many different settings.

The converter contemplated herein, therefore, effectively overcomes the drawbacks mentioned earlier which characterize conventional AC-to-DC converters.

While a preferred embodiment of the invention has been described herein, it is appreciated that variations and modifications may be made without departing from the spirit of the invention.

It is claimed and desired to secure by Letters Patent:

1. An AC-to-DC converter comprising
   a pair of input terminals adapted to be connected to a source of AC,
   a pair of rectifier circuits connected to said input terminals and each including a pair of DC output terminals, each of said rectifier circuits being adapted to produce DC between its output terminals with AC supplied said input terminals, and
   a shared voltage-regulating circuit operatively connected to said two rectifier circuits operable to regulate simultaneously the DC output voltages produced between each of said pairs of output terminals,
   said voltage regulating circuit including a transistor wherein conduction level changes are utilized to produce voltage regulation in the circuit, and electronic means responsive to the level of conduction in said transistor to minimize heat dissipation thereby.

2. The converter of claim 1, wherein two of said output terminals are connected together, each of said two terminals being from a different one of said pairs of output terminals, and said voltage-regulating circuit is connected between said two connected output terminals and the other output terminal in one of said pairs of output terminals.

3. The converter of claim 1, wherein said electronic means comprises a gatable electronic switching device operatively interconnecting said input terminals.

4. The converter of claim 3, wherein said gatable electronic switching device comprises a silicon-controlled rectifier.

5. An AC-to-DC converter comprising
   a pair of input terminals adapted to be connected to a source of AC, a rectifier circuit connected to said input terminals and including a pair of DC output terminals adapted to produce DC between said output terminals with AC supplied said input terminals, and a voltage-regulating circuit operatively connected between said output terminals for regulating the DC output voltage produced therebetween, said voltage-regulating circuit including a transistor wherein conduction level changes are utilized to produce voltage regulation in the circuit, and electronic means responsive to the level of conduction in said transistor to minimize heat dissipation thereby.

6. The converter of claim 5, wherein said electronic means comprises a gatable electronic switching device.

7. The converter of claim 6, wherein said gatable electronic switching device comprises a silicon-controlled rectifier.

8. An AC-to-DC converter comprising a pair of input terminals adapted to be connected to a source of AC, a pair of rectifier circuits connected to said input terminals and each including a pair of DC output terminals, each of said rectifier circuits being adapted to produce DC between its output terminals with AC supplied said input terminals, and a shared voltage-regulating circuit operatively connected to said two rectifier circuits operable to regulate simultaneously the DC output voltages produced between each of said pairs of output terminals, said voltage-regulating circuit including electronic means operatively interconnecting said input terminals for minimizing heat dissipation in the voltage-regulating circuit.

9. An AC-to-DC converter comprising a pair of input terminals adapted to be connected to a source of AC, a pair of bridge rectifier circuits each connected to said input terminals and each including a pair of DC output terminals, with one output terminal in each such pair connected to the corresponding output terminal in the other pair, each of said rectifier circuits producing DC between its output terminals with AC supplied said input terminals, a transistor connected between said interconnected corresponding output terminals and the other output terminal in one of said pairs of output terminals, responsive to DC voltage therebetween to change its level of conduction thereby to regulate and to tend to stabilize such voltage, and a silicon-controlled rectifier operatively interconnecting said input terminals, and responsive to the level of conduction in said transistor to conduct intermittently between said input terminals thus to limit heat dissipation by said transistor.

References Cited

UNITED STATES PATENTS

| | | | |
|---|---|---|---|
| 3,299,276 | 1/1967 | Buell et al. | 307—34 |
| 3,382,409 | 5/1968 | Assow et al. | 317—16 |
| 3,535,613 | 10/1970 | Katzenstein | 323—8 |
| 3,226,623 | 12/1965 | Krueger et al. | 321—18 X |
| 3,504,272 | 3/1970 | Kenny | 323—22 T |
| 3,512,044 | 5/1970 | Jones | 317—16 |

WILLIAM M. SHOOP, Jr., Primary Examiner

U.S. Cl. X.R.

307—34; 321—47; 323—22 T